Patented July 8, 1947

2,423,619

UNITED STATES PATENT OFFICE 2,423,619

METHOD OF PREPARING COPPER FUNGICIDE SOLUTIONS

Leo Roon, South Orange, N. J., assignor to Nuodex Products Co., Inc., Elizabeth, N. J., a corporation of New York No Drawing. Application November 10, 1943, Serial No. 509,809

12 Claims. (Cl. 167—22)

This invention relates to the making of copper fungicides adapted for general purposes where it is desired to apply a highly efficient fungicidal treatment in aqueous solution, and where, upon drying, the fungicidal agent will assume a substantially water-insoluble form.

The invention has many applications for protective treatment of cellulosic materials, such as coating cotton textiles, wood, rope, etc. It is well recognized that cellulosic articles without preservative treatment will rot quite rapidly when exposed to the attacks of fungi, such as mildew organisms. In some cases untreated cellulose fabric articles, such as sandbags, will rot in one to two weeks when subjected to conditions favorable for the growth of mildew. The same type of fabric material, when treated with certain fungicidal preservatives, will last under corresponding conditions for as long as two years.

Among the fungicides used, certain copper soaps, particularly copper naphthenate, have been heretofore employed with great success. These copper soaps have been applied either in the form of their organic solvent solution, or by way of an aqueous emulsion. They have also occasionally been used by dissolving the soaps in aqueous ammonia, wherein substantial solution takes place.

I have discovered that it is possible to obtain highly efficient aqueous ammonia solution of copper soaps by forming these copper soaps in situ in the aqueous ammonia, i. e., in the presence of aqueous ammonia. Thus it is possible, for example, to prepare an ammoniacal solution of copper naphthenate by reacting together, in the presence of aqueous ammonia, copper hydroxide or copper carbonate and naphthenic acid. This reaction takes place at room temperature with great rapidity and may be performed in simple apparatus.

By way of concrete example:

Example 1

| | | |
|---|---|---|
| Copper carbonate (56% copper) | grams | 82.6 |
| Water | cc | 500 |
| Ammonium hydroxide (28%) | grams | 210 |
| Naphthenic acid (A. N. 235) | do | 347 |

When the solution thus obtained was deposited upon the fabric, wood and other cellulose articles, it was found that the resulting deposit, upon evaporation of the ammonia and water, represented a substantially water-insoluble copper compound. When the treated articles were compared with articles treated with a solvent solution of copper naphthenate of equal concentration and the treated articles were exposed to a mildewing test, the copper compound deposited by the ammonia treatment proved at least as efficient as the copper naphthenate deposited by prior known procedures.

Among the advantages accruing from the use of the in situ method just described are the very simple and easy manipulation of the component raw materials as compared with the more difficult way of dissolving the taffy-like copper naphthenate salt in the ammonia. Also there is a definite saving in cost when the compound is prepared directly in the ammoniacal solution. There is no doubt therefore that, when it is desired to apply a normal copper soap in ammoniacal solution, the method of preparing it in situ, as hereinbefore described, possesses definite advantages over the method heretofore practised.

In the foregoing example, naphthenic acid has been referred to as the acid involved in the reaction. I have also demonstrated that one or more other acids either alone or in combination with naphthenic acid, may be employed to yield satisfactory fungicides in ammoniacal solution.

Example 2

| | | |
|---|---|---|
| Copper carbonate | grams | 82.6 |
| Water | cc | 500 |
| Ammonium hydroxide | grams | 205 |
| Oleic acid | do | 410 |

Example 3

| | | |
|---|---|---|
| Copper carbonate | grams | 82.6 |
| Water | cc | 500 |
| Ammonium hydroxide | grams | 200 |
| Hydrogenated rosin | do | 445 |

Example 4

| | | |
|---|---|---|
| Copper carbonate | grams | 82.6 |
| Water | cc | 500 |
| Ammonium hydroxide | grams | 210 |
| Naphthenic acid—oleic acid mixture (20% oleic) | grams | 360 |

Example 5

| | | |
|---|---|---|
| Copper hydroxide | grams | 71 |
| Water | cc | 570 |
| Ammonium hydroxide | grams | 240 |
| Benzoic acid | do | 177 |

Example 6

| | | |
|---|---|---|
| Copper hydroxide | grams | 71 |
| Water | cc | 570 |
| Ammonium hydroxide | grams | 210 |
| Naphthenic acid (A. N. 212) | do | 387 |

Example 7

| | | |
|---|---|---|
| Copper carbonate | grams | 82.6 |
| Water | cc | 500 |
| Ammonium hydroxide | grams | 210 |
| Naphthenic acid (A. N. 235) hydrogenated rosin mixture of which 15% is hydrogenated rosin | grams | 357 |

In the foregoing examples, copper carbonate has been referred to as the source of the copper, but this is by no means the exclusive source thereof. It is quite satisfactory, for example, to employ metallic copper, copper hydroxide or other appropriate copper raw materials for this purpose, the criteria being that such copper raw material shall be soluble in the ammonia and reactive therewith and with the acid used to form a water-insoluble compound when dried.

I have heretofore discussed the formation in situ of normal copper soaps in the presence of aqueous ammonia. The term "normal" refers to copper soaps in which the acid radical is stoichiometrically sufficient to bring about the formation of a copper soap which is neutral, i. e., one which is neither acid nor basic in character.

I have discovered that it is also possible and practical to produce highly efficient fungicides by forming in situ, in the presence of aqueous ammonia, hydroxy copper soaps. These soaps are so formulated that the amount of acid used is insufficient to form the normal or neutral compounds. The hydroxy copper soap is thus one which contains some free and unreacted OH groups. The unpredictable fact is that these hydroxy soaps perform equally as well as fungicides as do the normal copper soaps. This is surprising and wholly unexpected because it has long been a universally accepted fact that, e. g., copper hydroxide, or copper carbonate would not protect cellulosic fabric against mildew nearly as well as copper naphthenate or copper oleate, considered, of course, on an equal metal basis. Therefore it was not to be expected that a soap containing stoichiometrically insufficient acid radical would perform as efficiently as the corresponding normal copper soap.

I have found that there are very tangible advantages resulting in the use of hydroxy copper soaps as fungicides. Among these may be mentioned: substantially lower quantities of the acid radicals are required to bring about the same protective end result; due to the lower consumption of the acid radical, definite economies are obtained; less of the copper soap has to be deposited on the fabric in order to equal the same deposited metal content in the form of the normal soap and this means less change in weight, appearance and feel of the fabric. Because of the lower amount of acid radical, less combustible material is present on the treated fabric with resulting lesser fire hazard. The odor of the fabric treated with the hydroxy soaps is less affected by such treatment than when the normal soaps are employed.

Examples of the formation of the hydroxy copper soaps are as follows:

Example 8

| | |
|---|---|
| Copper carbonate (56% copper) | grams 82.6 |
| Water | cc 500 |
| Ammonium hydroxide (28%) | grams 210 |
| Naphthenic acid (A. N. 235) | do 129 |

For normal soap 347 grams acid would be necessary.

Example 9

| | |
|---|---|
| Copper carbonate | grams 82.6 |
| Water | cc 500 |
| Ammonium hydroxide | grams 205 |
| Oleic acid | do 129 |

For normal soap 410 grams acid would be necessary.

Example 10

| | |
|---|---|
| Copper carbonate | grams 82.6 |
| Water | cc 500 |
| Ammonium hydroxide | grams 200 |
| Hydrogenated rosin | do 129 |

For normal soap 445 grams acid would be necessary.

Example 11

| | |
|---|---|
| Copper carbonate | grams 82.6 |
| Water | cc 500 |
| Ammonium hydroxide | grams 210 |
| Naphthenic acid—oleic acid mixture (20% oleic) | grams 129 |

For normal soap 360 grams acid mixture would be necessary.

Example 12

| | |
|---|---|
| Copper hydroxide | grams 71 |
| Water | cc 570 |
| Ammonium hydroxide | grams 240 |
| Benzoic acid | do 129 |

For normal soap 177 grams acid would be necessary.

Example 13

| | |
|---|---|
| Copper hydroxide | grams 71 |
| Water | cc 570 |
| Ammonium hydroxide | grams 210 |
| Naphthenic acid (A. N. 212) | do 129 |

For normal soap 387 grams acid would be necessary.

Example 14

| | |
|---|---|
| Copper carbonate | grams 82.6 |
| Water | cc 500 |
| Ammonium hydroxide | grams 210 |
| Naphthenic acid (A. N. 235) hydrogenated rosin mixture of which 15% is hydrogenated rosin | grams 129 |

For normal soap 357 grams acid mixture would be necessary.

It will be apparent that all of the acids hereinbefore referred to possess the following characteristics, namely: they are organic acids, substantially water-insoluble, substantially non-volatile. They are selected as to form, upon evaporation of the ammonia and water, copper soaps which are substantially water-insoluble. Any acid which will be capable of producing, in the presence of the aqueous ammonia, a copper soap soluble within such system and depositing a water-insoluble copper soap upon application of the fungicide and subsequent drying, will satisfactorily function in accordance with the present invention.

In all of the foregoing examples, ammonia was used as a component of the system. I have found it feasible, however, to employ, in place of the ammonia, certain volatile organic amines, such, as for example, monoamyl amine, mono-N-butyl amine, triethyl amine. These amines appear to function in the same way that the ammonia functions in carrying out this invention.

It will be apparent from the foregoing that the present invention distinguishes from all prior practice in connection with the preparation of rotproofing compositions in many particulars among which is the fundamental concept of so preparing the fungicide compositions that the reactions of all of the component parts are effected in situ, to produce the desired end product.

In place of the fungicidal copper metal in the reaction, it is possible to employ other fungicidal metals without departing from this invention.

I have specifically described the application of the ammoniacal copper fungicide soaps as preservative agents for cellulosic materials. This by no means shall be considered as encompassing the entire utility of this invention. For example, the ammoniacal copper soap compositions are useful and valuable in connection with phytocidal oils and like compositions. Such compositions may include, for example, in addition to the ammoniacal copper soap, such agents as wax emulsions, resins, water-soluble waxes, and/or any other film-forming materials which would provide added valuable features to the phytocidal composition. They will, for example, improve the adhesiveness of the composition when applied to plants, other vegetation or articles. The ammoniacal hydroxy copper soaps are useful in conjunction with other components for the making of anti-fouling paints and for various other uses where a water-insoluble fungicidal copper soap is desirable.

The foregoing detailed description sets forth the invention in its preferred practical form, but the invention is to be understood as fully commensurate with the appended claims.

Having thus fully described the invention, what I claim as new and desire to secure by Letters Patent is:

1. The herein described method of making water-insoluble copper soap which comprises: reacting water-insoluble copper raw material selected from a group consisting of copper metal, copper hydroxide, and copper carbonate, together with at least one substantially water-insoluble monobasic organic acid in the presence of aqueous ammonia to produce in situ an aqueous ammoniacal solution of a substantially water-insoluble copper soap.

2. The herein described method of making water-insoluble copper soap which comprises: reacting water-insoluble copper raw material selected from a group consisting of copper metal, copper hydroxide, and copper carbonate, together with at least one substantially water-insoluble monobasic organic acid in the presence of aqueous ammonia, the copper raw material and the acid being present in stoichiometric quantities to produce an aqueous ammoniacal solution of a substantially water-insoluble copper soap.

3. The herein described method of making water-insoluble copper soap which comprises: reacting water-insoluble copper raw material selected from a group consisting of copper metal, copper hydroxide, and copper carbonate, together with at least one substantially water-insoluble monobasic organic acid in the presence of aqueous ammonia, there being present in the reaction less acid than the stoichiometrical quantity thereof necessary to produce a normal copper soap, whereby an aqueous ammoniacal solution of a hydroxy copper soap is obtained.

4. The herein described method of making water-insoluble copper soap which comprises: reacting water-insoluble copper raw material selected from a group consisting of copper metal, copper hydroxide, and copper carbonate, together with naphthenic acid in the presence of aqueous ammonia to produce in situ an aqueous ammoniacal solution of a substantially water-insoluble copper soap.

5. The herein described method of making water-insoluble copper soap which comprises: reacting water-insoluble copper raw material selected from a group consisting of copper metal, copper hydroxide, and copper carbonate, together with naphthenic acid in the presence of aqueous ammonia, the copper raw material and the acid being present in stoichiometrical quantities to produce an aqueous ammoniacal solution of a substantially water-insoluble normal copper soap.

6. The herein described method of making water-insoluble copper soap which comprises: reacting water-insoluble copper raw material selected from a group consisting of copper metal, copper hydroxide, and copper carbonate, together with naphthenic acid in the presence of aqueous ammonia, there being present in the reaction less acid than the stoichiometrical quantity thereof necessary to produce a normal copper soap, whereby an aqueous ammoniacal solution of a hydroxy copper soap is obtained.

7. The herein described method of making water-insoluble copper soap which comprises: reacting water-insoluble copper raw material selected from a group consisting of copper metal, copper hydroxide, and copper carbonate, together with oleic acid in the presence of aqueous ammonia to produce in situ an aqueous ammoniacal solution of a substantially water-insoluble copper soap.

8. The herein described method of making water-insoluble copper soap which comprises: reacting water-insoluble copper raw material selected from a group consisting of copper metal, copper hydroxide, and copper carbonate, together with oleic acid in the presence of aqueous ammonia, the copper raw material and the acid present in stoichiometrical quantities to produce an aqueous ammoniacal solution of a substantially water-insoluble normal copper soap.

9. The herein described method of making water-insoluble copper soap which comprises: reacting water-insoluble copper raw material selected from a group consisting of copper metal, copper hydroxide, and copper carbonate, together with oleic acid in the presence of aqueous ammonia, there being present in the reaction less acid than the stoichiometrical quantity thereof necessary to produce a normal copper soap, whereby an aqueous ammoniacal solution of a hydroxy copper soap is obtained.

10. The herein described method of making water-insoluble copper soap which comprises: reacting water-insoluble copper raw material selected from a group consisting of copper metal, copper hydroxide, and copper carbonate, together with hydrogenated rosin in the presence of aqueous ammonia to produce in situ an aqueous ammoniacal solution of a substantially water-insoluble copper soap.

11. The herein described method of making water-insoluble copper soap which comprises: reacting water-insoluble copper raw material selected from a group consisting of copper metal, copper hydroxide, and copper carbonate, together with hydrogenated rosin in the presence of aqueous ammonia, the copper raw material and the acid being present in stoichiometrical quantities to produce an aqueous ammoniacal solution of a substantially water-insoluble normal copper soap.

12. The herein described method of making water-insoluble copper soap which comprises: reacting water-insoluble copper raw material selected from a group consisting of copper metal, copper hydroxide, and copper carbonate, together with hydrogenated rosin in the presence of aqueous ammonia, there being present in the reaction less acid than the stoichiometrical quantity thereof necessary to produce a normal copper soap, whereby an aqueous ammoniacal solution of a hydroxy copper soap is obtained.

LEO ROON.

REFERENCES CITED

The following references are of record in the file of this patent:

UNITED STATES PATENTS

| Number | Name | Date |
|---|---|---|
| 993,827 | Ellis | May 30, 1911 |
| 1,482,416 | Snelling | Feb. 5, 1924 |
| 1,589,644 | Hedenburg | June 22, 1926 |
| 2,116,321 | Minich | May 3, 1938 |
| 2,149,284 | Gordon | Mar. 7, 1939 |
| 2,157,727 | Baker | May 9, 1939 |
| 2,335,101 | Belzer | Nov. 23, 1943 |
| 2,368,560 | Minich | Jan. 30, 1945 |

OTHER REFERENCES

Fullerton, Chemical Abstracts, vol. 36, 1942, page 1498.